US012445936B2

(12) United States Patent
De Foy et al.

(10) Patent No.: US 12,445,936 B2
(45) Date of Patent: Oct. 14, 2025

(54) METHODS AND DEVICES FOR HANDLING VIRTUAL DOMAINS

(71) Applicant: InterDigital Patent Holdings, Inc., Wilmington, DE (US)

(72) Inventors: Xavier De Foy, Kirkland (CA); Scott Hergenhan, Collegeville, PA (US); Michel Roy, Candiac (CA); Debashish Purkayastha, Collegeville, PA (US); Robert Gazda, Spring City, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 388 days.

(21) Appl. No.: 18/013,066

(22) PCT Filed: Jun. 29, 2021

(86) PCT No.: PCT/US2021/039639
§ 371 (c)(1),
(2) Date: Dec. 27, 2022

(87) PCT Pub. No.: WO2022/006125
PCT Pub. Date: Jan. 6, 2022

(65) Prior Publication Data
US 2023/0308985 A1 Sep. 28, 2023

Related U.S. Application Data

(60) Provisional application No. 63/046,823, filed on Jul. 1, 2020.

(51) Int. Cl.
*H04W 40/36* (2009.01)
(52) U.S. Cl.
CPC ................. *H04W 40/36* (2013.01)

(58) Field of Classification Search
CPC ..................................... H04W 40/36
See application file for complete search history.

(56) References Cited

U.S. PATENT DOCUMENTS

2011/0078229 A1\* 3/2011 Qiu ..................... H04L 61/4511
709/222
2014/0086177 A1\* 3/2014 Adjakple .............. H04W 74/04
370/329

(Continued)

FOREIGN PATENT DOCUMENTS

| CN | 102365847 A | 2/2012 |
| CN | 107646191 A | 1/2018 |
| IN | 201937010914 A | 7/2019 |

OTHER PUBLICATIONS

Anipko et al., "Multiple Provisioning Domain Architecture", Internet Engineering Task Force (IETF), Request for Comments: #7556, Category: Informational, ISSN: 2070-1721, Jun. 2015, 25 pages.

(Continued)

*Primary Examiner* — Duc C Ho
(74) *Attorney, Agent, or Firm* — VOLPE KOENIG

(57) ABSTRACT

A wireless transmit/receive unit, WTRU, connects to a first AP, receives domain identifiers, requests corresponding descriptors and receives a list of descriptors. An application on the WTRU requests a list of domains and attributes corresponding to service names or service sets, which is returned by the WTRU. The application selects one or more domains for communications, the WTRU selects corresponding network resources and the application connects to local services. After moving to a new location, the WTRU connects to a second AP and receives a second set of domain identifiers, selects the one matching the request from the application and provides these to the application that, with the aid of the WTRU connects to local services.

20 Claims, 8 Drawing Sheets

(56) References Cited

U.S. PATENT DOCUMENTS

2019/0223093 A1 7/2019 Watfa et al.
2023/0379985 A1* 11/2023 De Foy .............. H04L 61/4511

OTHER PUBLICATIONS

Anonymous, "Technical Specification Group Services and System Aspects; Study on enhancement of support for Edge Computing in 5G Core network (5GC)", 3rd Generation Partnership Project (3GPP), Release 17, Document: 3GPP TR 23.748 V0.3.0, Feb. 2020, 40 pages.

Trammell et al., "An Abstract Application Layer Interface to Transport Services—draft-ietf-taps-interface-05", Internet Engineering Task Force (IETF), Taps Working Group, Internet-Draft, Intended Status : Standards Track, Nov. 4, 2019, 64 pages.

Pfister et al., "Discovering Provisioning Domain Names and Data—Draft ietf intrea provisioning domains 11", Internet Engineering Task Force (IETF), Network Working Group, Internet Draft, Intended Status : Standards Track, Jan. 31, 2020, 33 pages.

Shao et al., "Multi-PvD Development Environment", Open Source : GitHub—IPv6-mPvD/pvd-dev, Jul. 16, 2018, URL: https://github.com/IPv6-mPvD/pvd-dev , 16 pages.

Anonymous, "Multi-access Edge Computing (MEC); Device application interface", Multi-access Edge Computing (MEC) ETSI Industry Specification Group (ISG), Document: ETSI GS MEC 016 V2.1.1, Apr. 2019, 22 pages.

Anonymous, "Technical Specification Group Services and System Aspects; Study on enhancement of support for Edge Computing in 5G Core network (5GC)", 3rd Generation Partnership Project (3GPP), Release 17, Document: 3GPP TR 23.748 V0.4.0, Jun. 2020, 184 pages.

Cheshire et al., "DNS-Based Service Discovery", Internet Engineering Task Force (IETF), Request for Comments: 6763, Category: Standards Track, ISSN: 2070-1721, Feb. 2013, 49 pages.

Nortel, "VCC for IMS Emergency Alternative 1 Editors Notes", 3GPP TSG SA WG2 Meeting #69, Td S2-087798, Nov. 17-21, 2008, Miami, Florida, USA, 15 pages.

\* cited by examiner

METHODS AND DEVICES FOR HANDLING VIRTUAL DOMAINS

CROSS REFERENCE TO RELATED APPLICATIONS

This application is a U.S. National Stage Application under 35 U.S.C. 371 of International Patent Application No. PCT/US2021/039639, filed Jun. 29, 2021, which is incorporated herein by reference in its entirety.

This application claims the benefit of U.S. Patent Application No. 63/046,823, filed Jul. 1, 2020.

BACKGROUND

With the advent of edge computing, wireless transmit/receive units (WTRUs) can now make use of local services, e.g. hosted in micro-datacenters in access networks or on customer premises. This can enable lower latency and higher privacy. An example of a local service that may be served by a server in a micro-datacenter is a user application lifecycle management proxy in a Multi-access Edge Computing (MEC) system, which serves a Representational state transfer (REST) Application Programming Interface (API). This API enables, for example, listing and starting of available MEC applications. The root of the API can be designated by a Fully Qualified Domain Name (FQDN) such as mec.provider.com. Discovery of a server instance for services such as this, and re-selection of another server instance when the WTRU is relocated, are currently being studied.

Current problems include, for example, that it is not determined how a WTRU should select the appropriate network interface and Domain Name Server (DNS) server; nor is it determined how to re-select an edge service instance when changing access point and Internet Protocol (IP) router. The present principles aims to address at least some of these issues.

SUMMARY

A method and wireless transmit/receive unit, WTRU, for receiving domain identifiers corresponding to domains, receiving first domain descriptors, each first domain descriptor comprising a service name or a service set, selecting first network resources based on a first domain selected by an application running on the WTRU, receiving second domain descriptors, each second domain descriptor comprising a service name or a service set, identifying domain descriptors present among both the second domain descriptors and the first domain descriptors, and selecting second network resources based on a second domain selected by an application running on the WTRU, the second domain being present among both the first domain descriptors and the second domain descriptors.

BRIEF DESCRIPTION OF THE DRAWINGS

Furthermore, like reference numerals in the figures indicate like elements, and wherein.

EXAMPLE NETWORKS FOR IMPLEMENTATION OF THE EMBODIMENTS

Figure 1A:
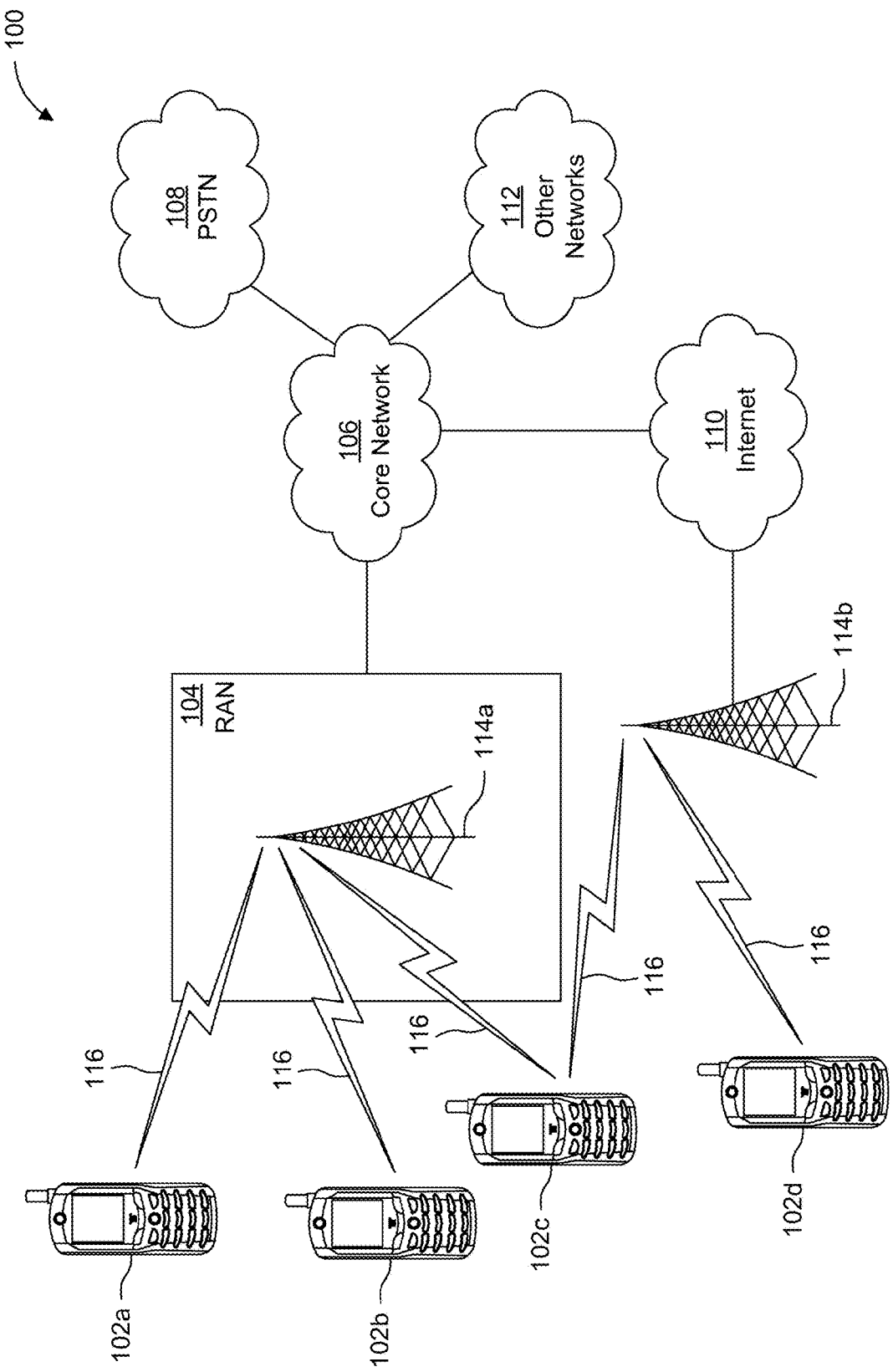
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a in the RAN 104 and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a in the RAN 104 and the WTRUs 102a, 102b, 102c may implement a radio technology such as NR Radio Access, which may establish the air interface 116 using New Radio (NR).

In an embodiment, the base station 114a in the RAN 104 and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The other networks 112 may include wired and/or wireless communications networks owned and/or operated by other service providers. For example, the other networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
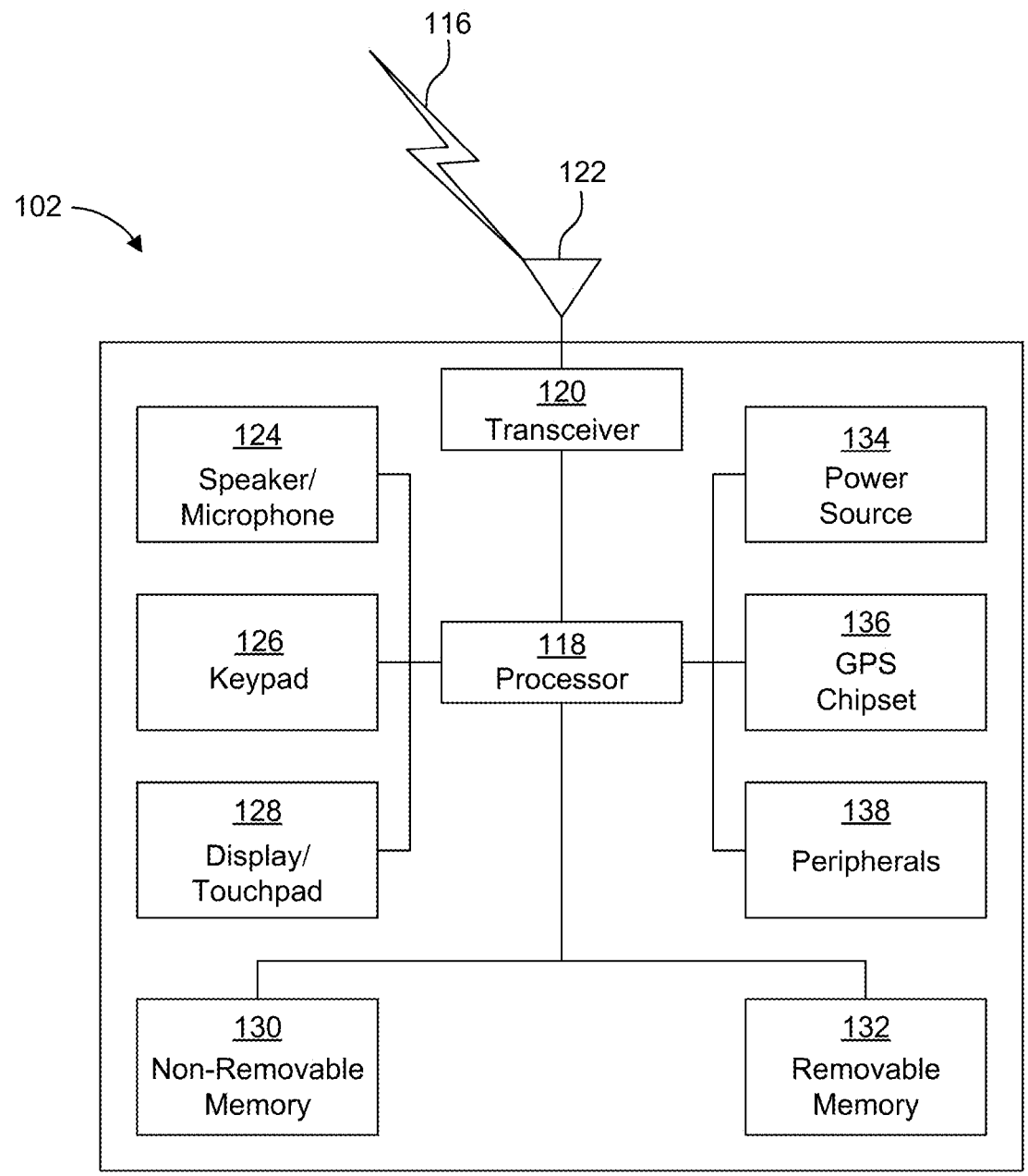
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a chipset 136 for a positioning system such as Global Positioning System (GPS), and/or other elements 138, among others. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a in FIG. 1A) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements 138, which may include one or more software and/or hardware modules that provide additional features, functionality and/or wired or wireless connectivity. For example, the elements 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The elements 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
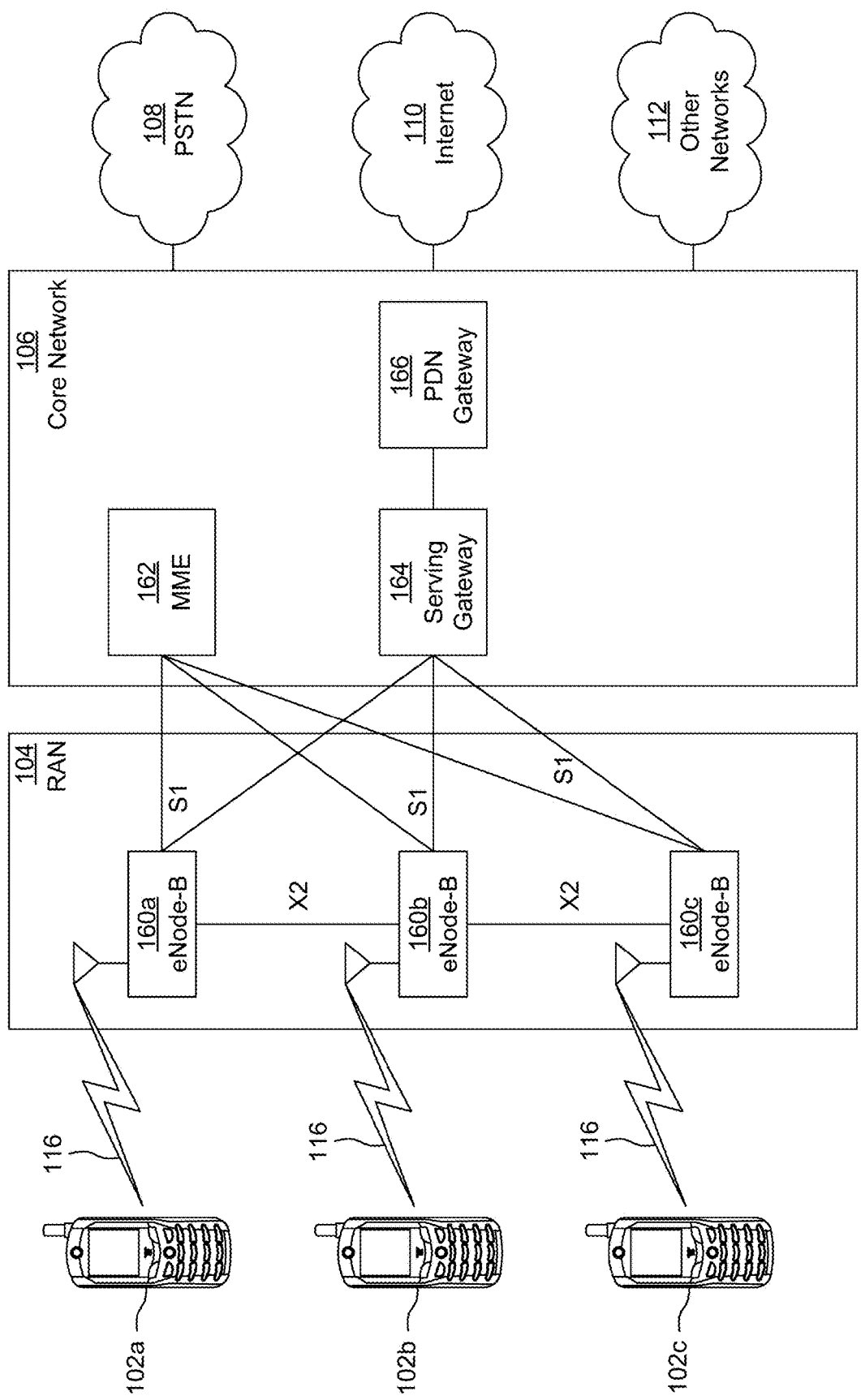
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHZ, 40 MHz, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHz, 8 MHZ, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
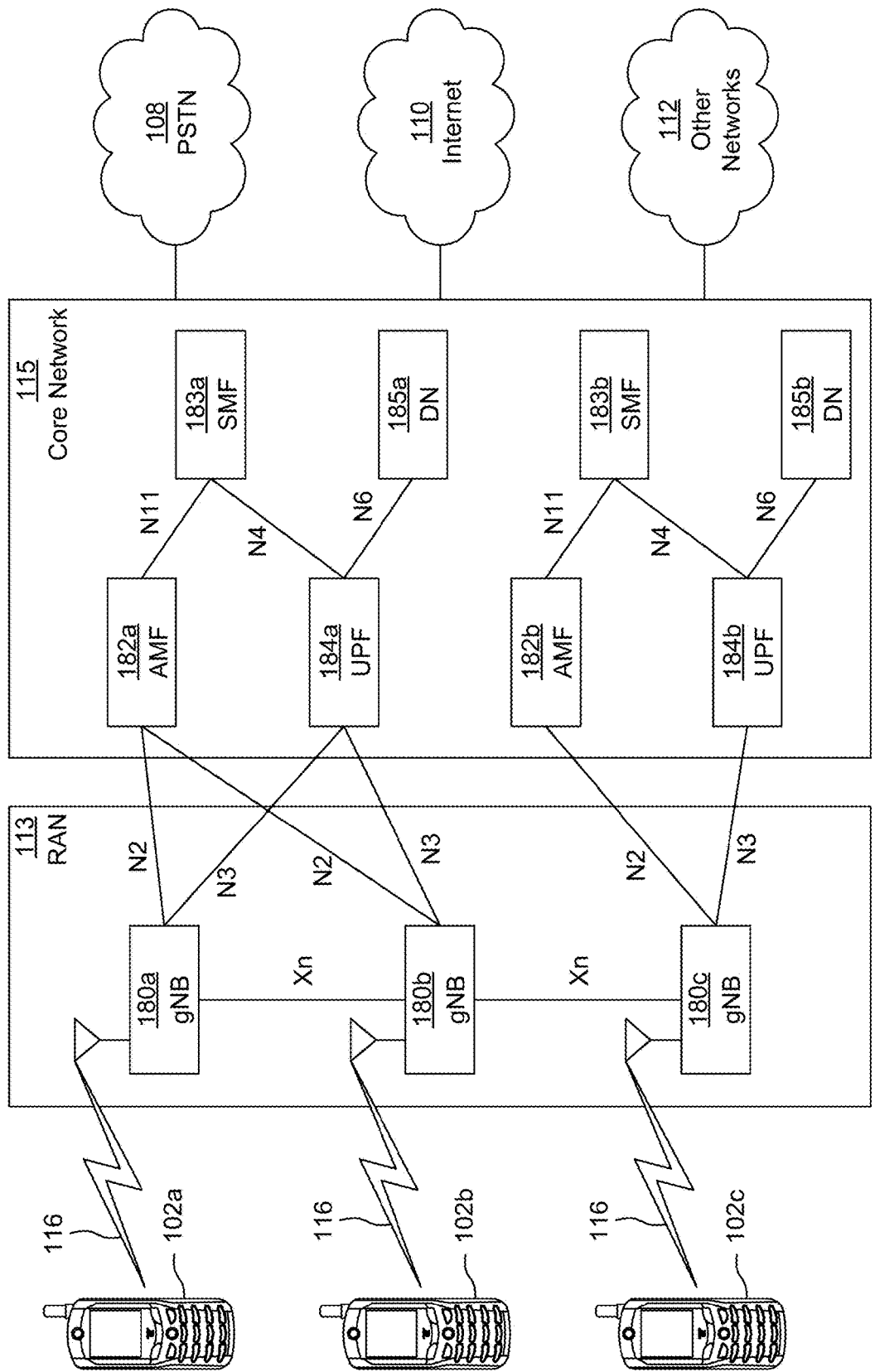
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b, 180c may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers (not shown) to the WTRU 102a. A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c in FIG. 1C). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG.

1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

DNS-SD defines a service discovery method using DNS so-called PTR, then SRV and TXT records. First, a client sends a DNS PTR request for a given service type, such as _printer._tcp.local. The DNS system replies with service names, e.g. PrinterName. printer._tcp.local. The client can then query SRV and TXT records associated with a service name. The SRV record query response is a FQDN of the service instance, e.g. myprinter.example.com, which can be resolved in another DNS query, into an IP address. The TXT record query response includes a list of key-value pairs that give additional information about the service instance.

Another common service discovery method on the Internet is to use DNS Canonical Names (CNAME) records. For example, www.example.com can be aliased, using a CNAME record, to www.example.com.<cdn-provider>.net, which itself can be aliased, using another CNAME record, to <instance-id>.<cdn-provider>.net.

A Provisioning Domain (PvD) is a consistent set of network configuration information and may represent a network to which a router gives access. PvDs have an identifier (ID) and attributes, which are visible to a WTRU and to WTRU applications. WTRU and WTRU applications can use the attributes to select an appropriate PvD. Typically, on a PvD-aware WTRU, a listening or client socket opened by a WTRU application may be associated with a PvD ID; as a consequence of this association, for this connection the WTRU uses local resources linked to the given PvD, e.g. DNS server, DNS cache, network interface, source IP address, next hop router, etc. "DNS server" used in this context typically designates a DNS recursive resolver, and more generally an entry point (first hop) into the DNS system for the WTRU. In the following, the expressions "DNS server" and "DNS resolver" designate such an entry point.

PvD IDs should be globally unique (e.g. through hierarchical means as a FQDN, or using a statistically unique ID, e.g. Universally Unique Identifier (UUID)). Explicit PvDs are advertised by the network. To handle non-PvD aware networks, a WTRU may create an implicit PvD, e.g. on a network interface basis. Although there is no single method to advertise explicit PvDs, in IPV6 networks a router may advertise PvD IDs to a host/WTRU using IPv6 router advertisements, and the rest of the PvD descriptor can be fetched as a JavaScript Object Notation (JSON) object by the host/WTRU using (secure) HTTP. On a PvD-aware WTRU, all operations related to one connection (e.g. socket), including DNS requests and caching, and interfaces used to send/receive packets, are associated with one PvD. Cached DNS records should not be reused between different PvDs. For multipath, all operations on each individual path connection are associated with a PvD, which may be different for each path connection.

Two examples of JSON objects representing PvD attributes are provided. It is noted that other attributes, such as the PvD ID and the DNS server IP address, are typically present in router advertisements, and are not present in the JSON object.

A first example represents access to a local edge cloud network PvD:
{
"name": "Edge Cloud provider.com",
"localizedName": "Edge Cloud provider.com, Montreal, CA, H3A 3G4",
"expires": "2020-03-06T10:00:00Z",
"prefixes": ["2001:db8:1::/48", "2001:db8:4::/48"],
"dnsZones": "['example.com', 'sub.example.org']"
"characteristics": {
"maxThroughput": {"down": 100000, "up": 50000},
"minLatency": {"down": 0.5, "up": 1}}

A second example represents a metered connection protected by a captive portal:
{
"noInternet":
"true",
"metered": "true",
"captivePortalURL":
"https://example.com/captive.html"
}

Problems and key issues with conventional solutions will be illustrated through two use cases.

In a first use case, a mobile phone user is playing a video game that discovers and makes use of local edge services (e.g. WTRU location service, video stream rendering service, a game application instance at the edge, a local chat relay, etc.). The mobile device is accessing the network through a wireless access point, and through an IP router providing access to a local network (e.g. a micro-data center). When the user changes location, the mobile phone attaches to another access point (AP), and may in some cases leave the service area of a first edge computing platform (e.g. in a first micro-data center) and enter the service area of a second edge computing platform (e.g. in a second micro-data center). The mobile phone discovers new instances of edge services currently in use, located in the second micro-data center, and accessed using given network resources (AP, IP router, DNS server, etc.). From this point on, the WTRU uses the service instances located in the second micro-data center. The transition may be immediate (e.g. connections to first instances are broken and re-established with the second instances) or gradual (e.g. the WTRU may continue and complete existing transactions with the first instances, and start new transactions using the second instances). In the first use case as in the second use case, APs may be WiFi or fixed APs provided by an Internet Service Provider (ISP) or a home/enterprise operator, 5G gNodeBs or other mobile network APs, or a combination of those.

In a second use case, a camera (or other IoT sensor) on a vehicle (e.g. a drone) is providing a streaming service to an IoT application instance running on an edge computing platform (e.g. in a micro-data center). Initially, the camera/WTRU makes itself discoverable by the IoT application, e.g. by registering with a local discovery edge service. The IoT application, once it becomes aware of the camera/WTRU, connects to the camera/WTRU and processes its output. When the vehicle changes location, the vehicle's gateway changes its attachment point to another AP, and in some cases leaves the service area of the first micro-data center and enters the service area of a second micro-data center. The camera/WTRU makes itself discoverable through a local discovery edge service on the second micro-data center. A second instance of the IoT application, running in the second micro-data center, discovers the streaming service offered by the camera and starts listening to and processing the stream immediately.

In both use cases, a WTRU needs to select proper network resources to use for its connection to the local service (e.g. network interface, IP router, DNS server, etc.). Moreover, the selection has to be performed again during the transition from one AP to the next. Preferably, the transition is performed with low latency so that the change of edge service area is at least virtually unnoticeable by the gamer and so that it does not lead to any (or only to limited) data loss in the IoT streaming use case.

The edge service operators and/or network operators involved before and after the transition may be different. The transition may occur, for example, between a 5G network and an enterprise or home network. Additionally, the edge service providers may be over-the-top application providers or Content Delivery Network (CDN) providers (e.g. Google, Facebook, Apple, Akamai), who deploy micro-data centers at various points in access and transit networks.

As the two use cases illustrate, there are, at least, two key issues: selecting (key issue 1), and re-selecting upon relocation (key issue 2), the proper network interfaces and IP routers, to access a local service. These key issues are applicable to the general Internet architecture, e.g. where a WTRU is connected through wireless and wired access points, e.g. using Wi-Fi and Ethernet technologies.

Since PvDs are designed for WTRUs and WTRU applications to select networks beyond IP routers, based on attributes associated with these networks, PvDs are used as building blocks for selecting network access and discovering local services. However, PvDs do not provide mechanisms to select, initially and after WTRU relocation, a PvD based on a service name or service set.

The first key issue may be described as follows. After attaching to a new AP, when a WTRU is multihomed and/or can use multiple routers, how should it select the network resources (network interfaces, IP routers, DNS servers, etc.) to discover local services? There are conventional methods in layer-2 (802.11aq, 802.11u) to identify which AP to attach to, based on local service identity. However, no such method exists for layer 3 to select a router based on local service identity, e.g. in deployments where WTRUs are facing multiple (virtual or physical) routers in individual sites (behind one or more APs). The choice of network resources to use for accessing local services should address make-before-break (MBB), e.g. selecting new network resources towards a second local service instance while a first local service instance is still in use, or break-before-make (BBM), where a connection to a first local service is lost before a connection to a second local service can be established.

Thus, regarding the first key issue, a multihomed WTRU may not be able to select the proper set of DNS resolver, network interface and IP router for discovering and connecting to a local service instance.

The second key issue may be described as follows. After attaching to a second AP, the WTRU should, within a short time frame, be able to select new network resources (e.g. network interfaces, IP routers, and DNS servers) to discover a second instance of a local service. Conventional DNS-based methods for local service discovery require setting an unusually low TTL (e.g. 1 second) to some records to ensure that the DNS system is queried again later after a WTRU relocation to a second AP (instead of re-using an obsolete, but still valid cached record). This can be wasteful and can lead to issues since many network elements and software components can interpret or modify the TTL value differently. Additionally, solutions based on DNS sniffing/interception are not valid in the long term, with the deployment of existing encryption-based technologies such as DNS over Datagram Transport Layer Security (DTLS) or Transport Layer Security (TLS), and the development of DNS over (e.g. secure) Hypertext Transfer Protocol (HTTP) or QUIC.

Thus, regarding the second key issue, a multihomed mobile WTRU may not be able to select the proper set of DNS resolver, network interface and IP router for discovering and connecting to a new instance of a local service it is already connected to.

Additionally, these key issues can benefit from being addressed also in the presence of multiple service providers: for example, multiple concurrent edge computing service providers may serve a geographic zone and may deploy non-overlapping service areas.

It will be appreciated that in addition to a solution to these key issues, additional mechanisms can be needed to fully enable discovering and connecting/reconnecting to local services. There are a number of mechanisms that can be used to discover a service (e.g. DNS CNAME redirection, and DNS-SD), but that will not be described further since they are well-known and since a WTRU application can use a transport protocol such as TCP or QUIC to connect to a local service. Such a WTRU application can be designed to support opening multiple connections to a local service (e.g. using each connection for a discrete number of application-layer requests). Such a WTRU application can support multiple concurrent application-level sessions with different local service instances and implement application-level logic to maintain consistency (e.g. complete ongoing transactions with a first instance and start new transactions with a second instance, e.g. maintaining isolated data views between instances). The present principles therefore aim to provide WTRU applications with the necessary information and notifications to perform these (re) connections.

According to at least an embodiment of the present principles, WTRU and PvD signaling are enhanced to support associating, based on a service name or service set, a PvD to an application connection. The WTRU can further send notifications to WTRU applications, when a new matching PvD becomes available. The WTRU application can initiate connections to a new local service instance over the new PvD(s), possibly concurrently with connections to the initial local service instance.

System Architecture

Figure 2:
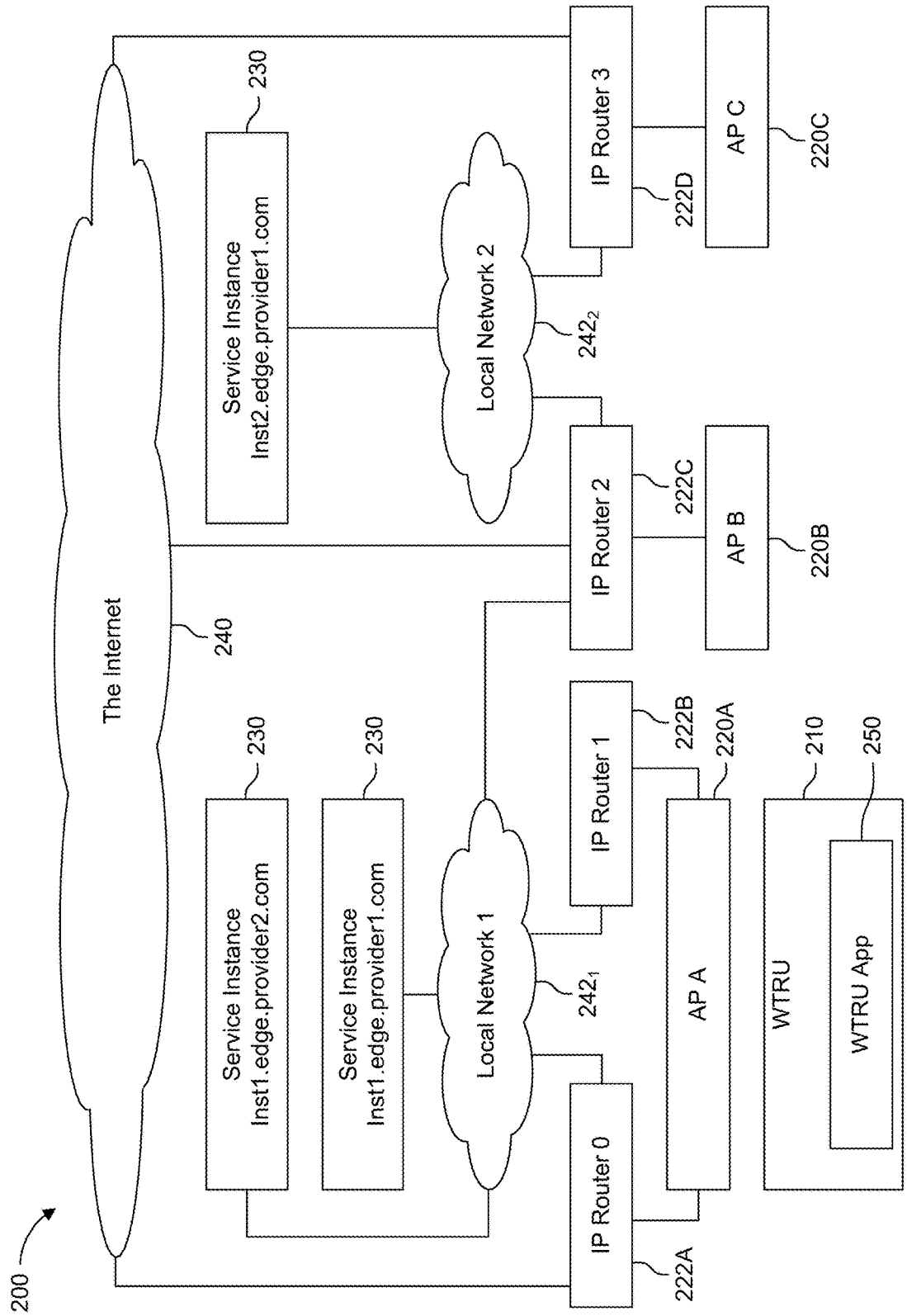
FIG. 2 is a system diagram illustrating a system according to an embodiment.

FIG. 2 is a system diagram illustrating a system 200 according to an embodiment of the present principles. A WTRU 210 is mobile and can associate successively with different access points 220A, 220B, 220C (AP, which may be wireless or wired access points), present in a same or different physical sites (e.g. a base station or enterprise location). Physical or virtual WTRU-facing IP routers 222A, 222B, 222C, 222D present at those sites can provide access to multiple networks, e.g. including the Internet 240, local networks $242_1$, $242_2$, remote networks through VPNs (not shown), etc. In some cases IP router(s) 222A, 222B, 222C, 222D may be collocated with an AP 220A, 220B, 220C, in other cases they may be hosted on separate network elements. Among these networks, local networks $242_1$, $242_2$ may host local services instances $244_1$, $244_2$, $244_3$, e.g. including local DNS resolver and/or local service instances (e.g. MEC discovery service instances). The IP routers 222A, 222B, 222C, 222D advertise, as PvDs, the network to which they provide access.

In the system 200, local service providers (e.g. edge cloud service providers) deploy local services (e.g. in micro data centers), access network operators (e.g., 5G network operators or enterprise network operators) provide connectivity to these local services, application providers provide software application components running on the WTRU (WTRU applications 250), the applications using the local services. Different operators and service/application providers typically exist in the system 200. It is noted that an entity can have multiple roles, e.g. as network operator and local service provider, or as application provider and local service provider.

A WTRU application 250 (e.g. a game, an IoT application, a client MEC application, a component of a MEC platform) can connect to a local service. The WTRU application 250 stores data regarding the service type (e.g. mec-service-discovery), server FQDN (e.g. 12345.mec-service-discovery.edge.provider.com), or anycast IP address of the server (e.g. 10.10.10.10). For simplicity, this data is referred to as "service name".

In some cases, multiple local services may be provided by a local service provider, with instances $224_1$, $244_2$, $244_3$ present in local networks 1 and 2, $242_1$, $242_2$. In case the instances are provided consistently in each local network, then they can be grouped as one "service set," e.g. in FIG. 2, edge.provider1.com can be a service set that includes discovery.edge.provider1.com, an MEC discovery service, and rendering.game-abc.edge1.provider.com, a video rendering service for a game.

In conventional solutions, a WTRU application 250 already needs to be aware of the service name/set (e.g. a FQDN) identification to connect to a service instance. According to the present principles, the WTRU application 250 can also use a service name/set ID (same as or different from the service name/set ID used for connecting) to select the PvD, and thus to the local network, IP router, DNS server, to use for discovering the service instance. The terms "name" and "set" can be used to indicate the level of granularity of the service (e.g. "name" can indicate support for an individual WTRU application and "set" can refer to a platform supporting multiple WTRU applications).

Access network operators configure service names and/or sets in Provisioning Domains (PvDs). New PvD information elements (IE) can include service names/sets, service instance IDs, and authentication/authorization tokens. Several possible encoding methods can be used, as will be described.

Figure 3:
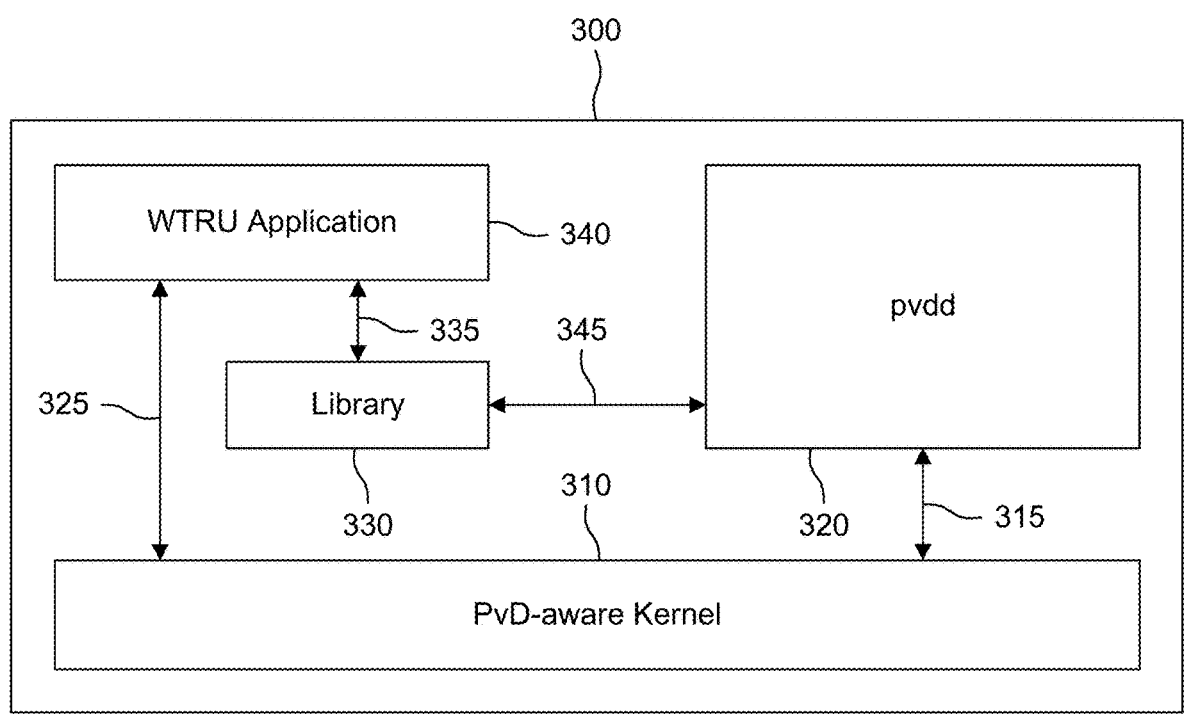
FIG. 3 illustrates an implementation of service name/set support on a WTRU according to an embodiment.

WTRU applications 250 make use of service names/sets and associated IEs to connect concurrently or successively to local service instances. How WTRU applications 250 interwork with other components of the WTRU 210 to achieve this goal will be described further with reference to FIG. 3. For example, a WTRU application 250 may first connect to a first service instance (e.g. $244_1$) through AP A, then re-connect to the first service instance and connect to a second service instance (e.g. $244_3$) through AP B, and finally re-connect to the second service instance through AP C. There may also be a break between these connections (e.g. the WTRU may move from AP A to AP C directly, losing connectivity to the first service instance prior to establishing a new connection to the second service instance). How WTRU applications can deal with different service continuity cases will be described further; FIG. 4 illustrates a service continuity method message flow according to an embodiment of the present principles.

Multiple instances of a local service (having the same service provider) may be available to the WTRU 210 (e.g. initially or later on). This is illustrated in FIG. 2 at AP B 220B, which provides access to local networks 1 and 2, $242_1$, $242_2$, and to local service instances inst1 $244_1$, $244_2$ and inst2 $244_3$. The WTRU 210 provides a list of the available PvDs, and their attributes, to the WTRU application 250. The WTRU application 250 may use of this information to select one or more PvDs it wishes to use to access a single local service instance or concurrently several local service instances (e.g. based on application policy).

When multiple local service providers are available, the WTRU application 250 may use one or the other. The WTRU application 250 can determine the local service provider to use based on PvD information elements, application configuration, service name/set currently in use, and/or user input. In an example where the WTRU 210 is attached to AP A 220A, at startup a WTRU application 250 may need to determine whether to connect to inst1.edge.provider1.com $244_1$ or inst1.edge.provider2.com $244_3$, which respectively belong to service sets edge.provider1.com and edge.provider2.com, both present in PvD net1.edge.op1.com. Since both service sets are available, and since (for example) edge.provider1.com has higher priority than edge.provider2.com in WTRU application configuration, then WTRU application 250 may connect, using PvD net1.edge.op1.com, to instance inst1.edge.provider1.com.

In some embodiments, PvD-based service name/set support is integrated with other service discovery methods, which can improve overall service discovery efficiency and latency. For example, some APs (e.g., AP A, B and/or C in this example) may enable pre-association service discovery, e.g. using 802.11aq. By leveraging the methods of the present principles, such an AP may obtain the service names/sets from all routers with which it is connected, e.g. obtaining PvD IDs from Router Advertisements (RAs) and then obtaining PvD attributes over Hypertext Transfer Protocol Secure (HTTPS). An AP may advertise the obtained service names/sets using 802.11aq. The AP may limit its advertisement to only service names/sets it can authenticate/authorize (e.g. using auth Token as described herein). WTRUs may select, prior to association, APs that advertise the desired service name/set.

Local Service Information Encoding in PvDs

A WTRU application may request a connection using a service name, i.e. an identifier of an individual service, such as discovery.mec.edge.provider.com, or using or a service set, i.e. an identifier of a set of individual services, such as edge.provider.com. The decision to use one or the other can be made by the local service provider and/or the application developer. Using a coarser granularity (i.e. a service set) can simplify applications and PvD configurations since it requires less identifiers to be exposed in PvDs. One or more service names/sets may be encoded in a PvD. Service names/sets should typically be FQDNs, although they may take other forms such as strings, anycast IP addresses, etc.

Moreover, service names/sets map to different instances located in different local networks. An instance ID may therefore also be encoded in a PvD to identify a specific instance of the individual service or service set. Instance IDs may be strings that can be used as a FQDN component, may be an FQDN formed using service name/set as prefix, or may in some cases be IP addresses.

It is noted that the use of service name/set to enable local service continuity may lead to new forms of attacks, where an attacker controlling a router advertises a PvD with a well-known service name/set. WTRUs selecting this PvD for a given service may then lose the service (denial-of-service attack) or connect to a local service under the control of the attacker. In an attempt to prevent such attacks, a service name/set advertised in a PvD may be authenticated, e.g. with a signature, by the service provider made using a private key in the possession of the service provider, that can be verified by the WTRU application. The signature can cover a unique identifier such as the PvD ID, in addition to the service name/set, and other related information (e.g., instance ID, service IP addresses, etc.).

According to the present principles, the following information elements can be encoded in a PvD IDs and/or PvD descriptor:

A service name/set, e.g. a FQDN, that uniquely identifies an individual service or a set of services.

A service instance ID, e.g. a FQDN or FQDN component, that uniquely identifies an instance of an individual service or set of services.

A token, authToken, that authenticates the service name/set and instance ID as being advertised with the agreement of the service provider.

In the following examples, auth Token may be a signature of the PvD ID and service params by the service provider, e.g. a JSON Web Token based on the string "{ "pvdId": "<pvdid>", "serviceInstance": "<instance ID>.<service name>"}".

Service name/set can be present in PvD IDs, as a suffix thereof. For example, a PvD ID may be constructed as <instance>.<service-name/set> (e.g. 1234.edge.provider.com). However, since the PvD ID is likely to be a FQDN in a domain controlled by the access network operator and the service name/set is likely to be a FQDN in a domain controlled by the service provider, it can be preferred to encode explicitly service name/set and instance ID into PvDs.

Explicit service names and instance IDs can for example be encoded as a new attribute, such as a "services" array of JSON objects, where each object contains explicit service name and instance information. This new attribute can be preferred over reusing the existing "name" or "localized- Name" attributes, which are free strings assumed to be human readable. It can also be preferred over the existing "dns Zones" array, which is assumed to hold FQDNs of domains, not instances. However, "name", "localizedName" and "dnsZones" can be temporarily used, e.g. in situations where a new "services" array is not yet supported everywhere.

In an example, service name/set and instance ID are encoded in the PvD ID, and the token is in the PvD descriptor:
PvD ID:
"1234.edge.provider.com"
PvD descriptor:
{
  ( . . . )
  "authToken":
"eyJhbGciOiJIUzI1NiIsInR5cCI6IkpXVCJ9.eyJwdm
  RJZCI6IjEyMzQuZWRnZS5wcm92aWRlci5jb20i
  LCJzZXJ2aWNlSW5zdGFuY2UiOiIxMjMOLm
  VkZ2UucHJvdmlkZXIuY29tIn0.8WMGPS2gfpasss
  Usw6DUCKY3mRc-OfLEJ-nLtQvlXA"
}

In another example, service name/set, instance ID and token are encoded in the PvD descriptor. They may be encoded in separate fields (first entry, serviceName and serviceInstance), as a single field where the service name/set is the suffix of serviceInstance (second entry). IP addresses of servers may be associated with a service instance (third entry). While the field is named In another example, service name/set may be encoded using the "name" attribute, and instance ID may be encoded using the "localized name" attribute:
PvD ID:
"abcd.example.org"
PvD descriptor:
{
  ( . . . )
  "name": "edge.provider.com",
  "localizedName": "1234.edge.provider.com",
  "authToken":
"eyJhbGciOiJIUzI1NiIsInR5cCI6IkpXVCJ9.eyJwdm
  RJZCI6ImFiY2QuZ
  XhhbXBsZS5vcmciLCJzZXJ2aWNlSW5zdGFuY2
  UiOiIxMj            MOLmVkZ2UucHJv
  dmlkZXIuY29tIn0.CtH0E1-SDSlptYR4fHotmOFK-
  bkWKy_TaPiEj 6W3WfY"
}

In another example, service name/set and instance ID, instead of being encoded in a new "services" attribute, may be encoded in existing "dns Zones" attribute:
PvD ID:
"abcd.example.org"
PvD descriptor:
{
  ( . . . )
  "dnsZones": ["1234.edge.provider.com"],
  "authToken":
"eyJhbGciOiJIUzI1NiIsInR5cCI6IkpXVCJ9.eyJwdm
  RJZCI6ImFiY2QuZ "serviceName", it may hold a service name such as
"discovery2.mec.edge.provider.com" or service set such as
"edge.provider.com". This can for example give:
PvD ID:
"site1.operator.org"
PvD descriptor:
{
  (...)
  "services":[
    {
      "serviceName":
    "discovery2.mec.edge.provider.com",
      "serviceInstance": "1234"
      "authToken":
      "eyJhbGciOiJIUzI1NiIsInR5cCI6IkpXVCJ9.eyJwdmRJZCI
      6ImFiY2QuZXhhbXBsZS5vcmciLCJzZXJ2aWNlSW5zdGFuY2Ui
      OiIxMjM0LmVkZ2UuZGlzY292ZXJ5NC5tZWMucHJvdmlkZXIuY
      29tIn0.ty-
      F2wQv_tVHZmn6QPqgQ2AkT2KnzYvuMtFTu2Tv9Ew"
    },
    {
      "serviceInstance": "1234.edge.provider.com"
      "authToken":
      "eyJhbGciOiJIUzI1NiIsInR5cCI6IkpXVCJ9.eyJwdmRJZCI
      6ImFiY2QuZXhhbXBsZS5vcmciLCJzZXJ2aWNlSW5zdGFuY2Ui
      OiIxMjM0LmVkZ2UucHJvdmlkZXIuY29tIn0.CtH0E1-
      SDSlptYR4fHotm0FK-bkWKy_TaPiEj6W3WfY"
    },
    {
      "serviceInstance":
      "1234.discovery3.mec.edge.provider.com",
      "addresses": [ "2001:db8::12", "2001:db8::13" ]
      "authToken":
      "eyJhbGciOiJIUzI1NiIsInR5cCI6IkpXVCJ9.eyJwdmRJZCI
      6ImFiY2QuZXhhbXBsZS5vcmciLCJzZXJ2aWNlSW5zdGFuY2Ui
      OiIxMjM0LmRpc2NvdmVyeTIubWVjLmVkZ2UucHJvdmlkZXIuY
      29tIn0.PPzK4nzqS8R479A9BF09o7fPVLHcee1y6f9WnJ0BTb
      4"
    }
  ]
```

XhhbXBsZS5vcmciLCJzZXJ2aWNlSW5zdGFuY2
UiOiIxMjMOLmVkZ2UucHJvdmlkZXIuY29tIn0.
CtH0E1-SDSlptYR4fHotmOFK-
bkWKy_TaPiEj6W3WfY"
}

Local Service-Related APIs and WTRU Application Behavior

FIG. 3 illustrates an implementation of service name/set support on a WTRU 300 according to an embodiment of the present principles.

Conventional PvD implementation may be leveraged to implement a (e.g., local) service-based PvD connection. In a typical PvD implementation, PvD mechanisms (e.g. binding a PvD and associated DNS cache to a socket) are implemented in the OS kernel 310, and a user space program 320 (e.g. pvdd) runs as a background program to provide an API to local WTRU applications. Pvdd 320 can typically retrieve/create/modify/delete PvDs and PvD information elements over a kernel API 315. A new component 330 of a local WTRU application 340 (e.g. a service name/set support library) can communicate with pvdd 320, using an existing pvdd user-space API 345, to query the list of available PvDs and their attributes, to subscribe/unsubscribe to the modifications of the PvD list, or to the modification of attributes of a given PvD.

The service name/set support library 330 provides an API 335 to the WTRU application 340, enabling operations such as listing PvDs associated to a given service name/set; subscribing/unsubscribing to modification of the available PvD list relative to a service name/set; subscribing/unsubscribing to modification of attributes of PvDs relative to a service name/set. The WTRU application 340 can make use of the service name/set-based PvD API, for example to discover a suitable PvD to connect to a local service instance, and then later to connect to new local service instances that become available when the WTRU attaches to new access points.

Local Service Continuity Cases

To initially connect to a local service instance, a WTRU application can (e.g. through service name/set support library) request a list of PvD IDs associated to a service name/set and obtain PvD attributes for those PvDs. Then, the WTRU application can select one of the available PvD IDs based on the attributes and based on application and local policy. For example and as already mentioned, WTRU or application configuration may state that provider1.com has a higher priority than provider2.com. For example, to select between available instances, the WTRU application may connect to each and select the one with lowest latency. The WTRU application may register a callback function for added/removed PvDs associated with a given service name/set. When the WTRU application is notified of a new matching PvD ID (e.g. when the callback function is called), the WTRU application may use the TAPS API 325 to open a socket associated with this PvD ID, and then use this socket to connect to a local service instance. If multiple matching PvDs are available, the WTRU may select one based on local policy (e.g. use PvD available over fixed interface, then WiFi interface, then cellular). If no matching PvD is available, the WTRU application may process this as a failed connection request.

From this point on, the WTRU may be mobile and change attachment point. The WTRU may discover new PvD IDs over a new attachment point. Each new PvD may fall in one of the following cases:

1. a PvD matching the service name/set has a different PvD ID and gives access to a different local network, e.g. with different instance ID.
2. a PvD matching the service name/set has the same PvD ID as a currently used PvD.
3. a PvD matching the service name/set has a different PvD ID as a currently use PvD, but may give access to the same local network, e.g. with same instance ID.
4. a PvD not matching the service name/set. Since it does not match a service name/set requested by WTRU application, WTRU will not notify the WTRU application in this case.

Regarding case 1: when the WTRU is relocated into the service area of a second local network, the WTRU will get access to the second local network through a second PvD that matches the service name/set requested by the WTRU application. The WTRU notifies the WTRU application and provides it with the second PvD ID and attributes. The WTRU application can then open a new socket associated with the second PvD ID, and initiate communication with the second local service instance using a service discovery method (e.g. DNS request with pre-configured FQDN, anycast IP address, DNS-SD, etc.). Since the second PvD ID is different from the first, a separate DNS cache will be used for this second connection. There is therefore no issue with stale DNS records.

Regarding case 2: two routers providing access to the same local network may advertise the same PvD ID, e.g. following a decision by a network operator. Upon reception of a new router advertisement re-using the first PvD ID, a WTRU may update the local context for this PvD ID, e.g. add a new network interface and a new router IP address to the existing local context for this PvD ID. The existing connections using this PvD ID are not modified from the local application standpoint. However, a local application subscribed to modifications of PvD attributes may be notified of the new network interface and may decide to migrate its connection to a local service over the new network interface (e.g., using the migration feature of the QUIC protocol). The WTRU application may continue to use the same destination IP address for the local service instance.

Regarding case 3: two routers providing access to the same local network may advertise different PvD IDs with same service name/set, and same instance ID, e.g. following a decision by a network operator. A WTRU application that becomes aware of this second PvD ID may decide to continue using the same destination IP address for the local service instance, or to let the network select a new instance. This decision can be made by the application developer, as an application design tradeoff: reusing the IP address leads to a shorter discovery time (over the second PvD), by one RTT, at the cost of not letting the network re-select a new instance over the second PvD (which may be preferable in some system, e.g. to reduce service latency). Depending on this choice, case 3 may therefore, from the WTRU application standpoint, be similar to case 1 (re-select possibly a new local service instance) or case 2 (keeping communicating with the same local service instance).

In all cases, the WTRU application should be designed for PvD-based local service continuity. This includes a WTRU application able to one or more of:

request a connection (e.g. socket) or PvD based on a service name/set, register to service name/set-based PvD events, react to service name/set-based PvD events, e.g. initiate a new connection in replacement or in complement to the first connection to the service, when a new matching PvD is found.

When applicable, associate application state information with PvD IDs or service instances. For example, cached service discovery information obtained from a MEC discovery service over a given PvD may not be valid for use on another PvD.

PvD-Based Local Service Continuity Procedure

Figure 4A:
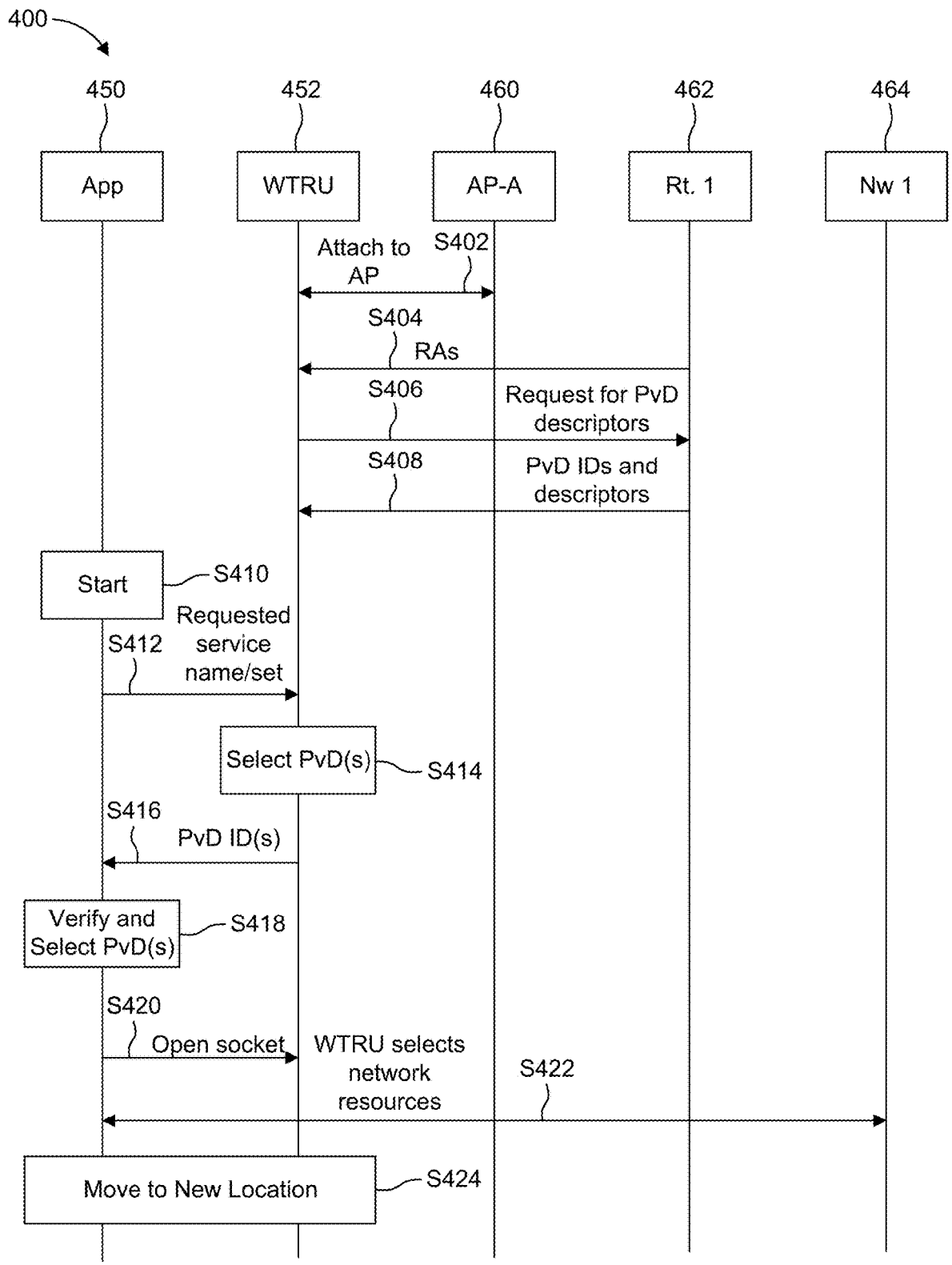
FIGS. 4A and 4B together illustrate a service continuity method message flow according to an embodiment of the present principles.
Figure 4B:
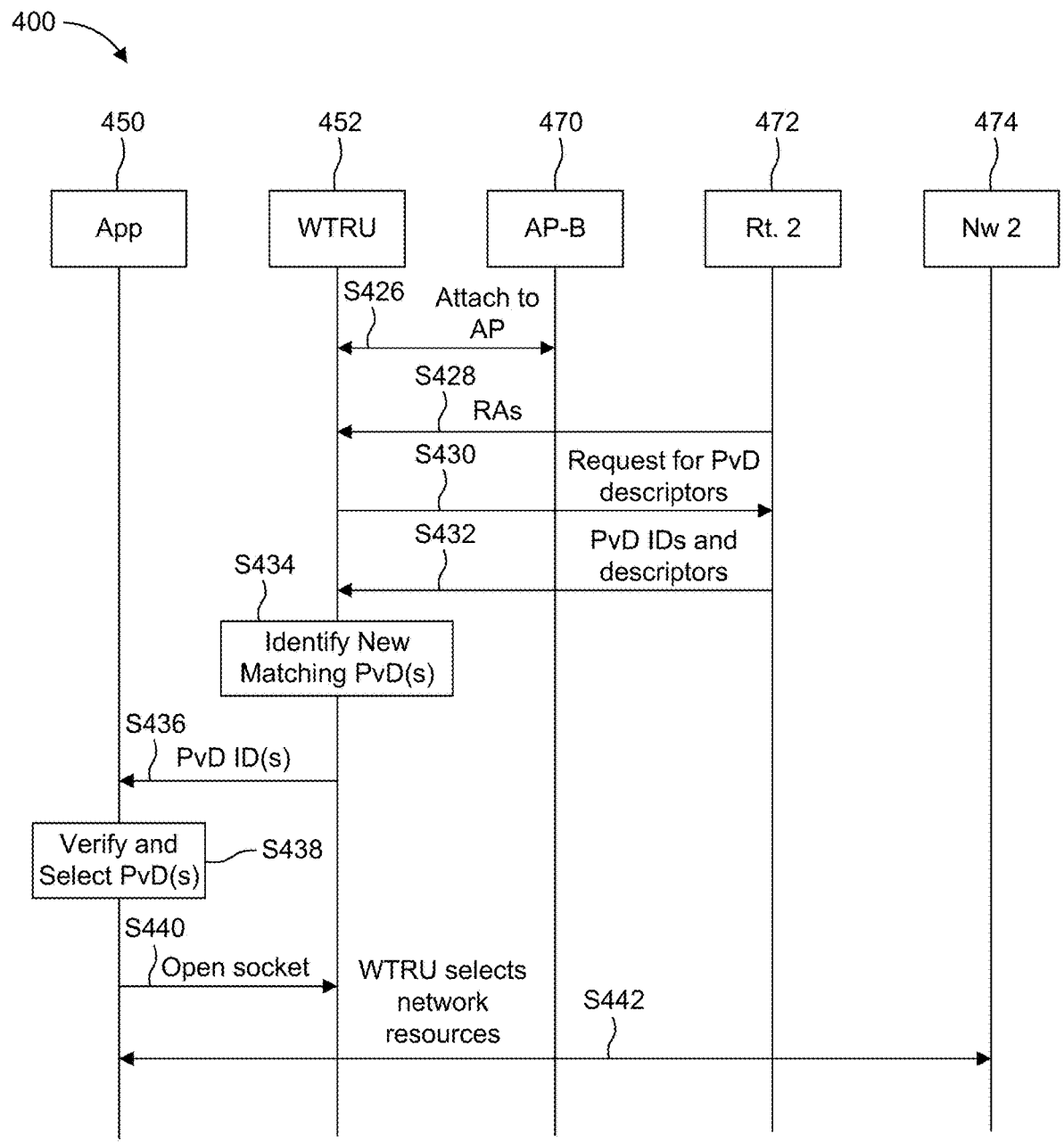

FIGS. 4A and 4B together illustrate a method 400 for PvD-based local service continuity according to an embodiment of the present principles. FIG. 4A illustrates steps of the method until a WTRU 452 has moved to a new location; FIG. 4B illustrates steps after the move. It is noted that although the Figures look alike, apart from the WTRU Application 450 and the WTRU 452, they involve different APs, routers and local networks.

Briefly speaking, the WTRU application connects to a local service instance on local network 1, and after a WTRU relocation, the WTRU application connects to a local service instance on local network 2 (concurrently or successively with the first instance). The entities exchanging messages in FIG. 4 were introduced already in FIG. 2 and FIG. 3. With respect to the non-limiting implementation example in FIG. 3, the WTRU entity in FIG. 4 includes kernel, pvdd and service name/set support library. AP-A and AP-B are fixed or wireless access point, Router1 and Router2 are IP (e.g., IPv6) routers.

In step S402, WTRU 450 attaches to AP-A 460 (e.g., this step may include a WiFi association procedure, a 5G network registration, and/or a PDU session establishment).

In step S404, Router1 462 sends solicited or unsolicited RAs, including PvD IDs to the WTRU 452.

In step S406, WTRU 452 requests, from Router1 462, PvD descriptors for each PvD, over HTTPS.

In step S408, for each request, Router1 462 (or another network node serving the PvD descriptor) sends the PvD descriptor, e.g. a JSON object to the WTRU 452. Service name/set, service instance ID, authentication/authorization token may be encoded in PvD ID and/or PvD attributes.

While in this exemplary procedure PvD information (ID and descriptors) is conveyed using RAs, alternative methods may be used to transmit this information. For example, steps S404-S408 may be replaced, e.g. in 5G systems, with PvD information transmission through WTRU policy from PCF. In such case, attachment may not be needed prior to obtain PvD information, and therefore step S402 may occur later, e.g. prior to step S422. Other modes of PvD information transmission may be used as well, including whole or partial configuration/caching of PvD information. Any of those alternatives may also apply to steps S426-S432.

Once PvD information related to a given PvD ID is obtained by WTRU, WTRU creates a local context including PvD ID, PvD parameters from the PvD descriptor, and information elements obtained from the network in association with this PvD, for example, through router advertisements associated with the PvD ID, or through other means. Examples of such information elements include source address prefixes, IP address(es) of DNS server(s), default gateway address. Local context parameters associated with a PvD are used in further operations associated with this PvD (e.g. connection establishment).

In step S410, PvD-aware WTRU application 450 starts.

In step S412, WTRU application 450 requests, from the WTRU 452, PvD list and attributes matching one or more service name(s)/set(s), and registers for events relative to matching PvDs (e.g. added/removed PvD, change of attributes, etc.).

In step S414, WTRU 452 obtains the current list of PvDs and matches PvDs based on requested service name(s)/set(s).

In step S416, WTRU 452 provides matching PvD IDs and related attributes to WTRU application 450.

In step S418, WTRU application 450 may verify the authenticity of the service name(s)/set(s) and instance ID(s), e.g. using the authToken attribute. WTRU application 450, using PvD attributes, selects one or more PvDs for its communications.

In step S420, WTRU application 450 opens a socket associated with the selected PvD ID or PvD IDs (not illustrated).

In step S422, WTRU 452 selects network resources (including some of: network interface, DNS server and cache, default IP router, etc.) based on associated PvD. At this point, WTRU application 450 can communicate with local network 1 464. WTRU application 450 discovers and/or connects to local service instance(s) on local network 1 464.

In step S424, WTRU 452 moves to a new location.

It is noted that WTRU may lose connection to initial local service instance over first PvD (BBM case), or it may still be able to communicate with network 1 for some time, either through AP-A or AP-B (MBB case).

As mentioned, the method is now illustrated in FIG. 4B.

Steps S426-S432 are similar to steps S402-408 but with another AP 470 and router 472: WTRU 452 attaches to AP-B 470 and obtains PvD information from the Router2 472.

In step S434, WTRU 452 detects, among the new PvDs, PvDs that match the requested service name/set and, in step S436, WTRU 452 notifies the WTRU application 450 and provide matching PvD IDs and attributes to it.

In step S438, WTRU application 450 may verify the authenticity of the service names/sets and instance IDs, e.g. using the authToken attribute. WTRU application 450 selects, using service names/sets and instance IDs, PvDs it wishes to use, as well as the WTRU application behavior. Different cases include, as already described:

1. new PvD ID, different instance ID (e.g., connecting to the same or a different local network): e.g., discover, then open a new concurrent connection to a new local service instance on local network 2,
2. same PvD ID, new interface/router: e.g., perform a connection migration towards the same local server (e.g., if using QUIC, perform a QUIC connection migration, or if using MPTCP or MPQUIC, start using a new path),
3. new PvD ID, same instance ID (e.g., typically when connecting to the same local network): e.g., open a new concurrent connection towards the same local server, using the same destination IP address and typically a different source IP address, using the new PvD ID. Or, in another example, discover and connect to a second local server, using the new PvD ID. In this last example, the second local server may be the same as the first, or a new server, as decided by the DNS service.

In step S440, WTRU application 450 opens socket(s) associated with one or more newly selected PvD(s).

In step S442, WTRU 452 selects network resources (e.g. including network interface, DNS server and cache, default router, etc.) based on associated PvD. At this point, WTRU application 450 can communicate with local network 2 474.

WTRU application 450 discovers and/or connects to local service instance(s) on local network 2 474.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra-Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine. In addition, although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method, in a wireless transmit/receive unit (WTRU), the method comprising:
    receiving provisioning domain identifiers corresponding to provisioning domains and first provisioning domain descriptors, each first provisioning domain descriptor comprising a service name or a service set;
    receiving, from an application running on the WTRU, at least one requested service name or service set;
    providing to the application provisioning domain identifiers matching the at least one requested service name or service set;
    selecting first network resources based on a first provisioning domain selected by the application;
    receiving, after WTRU relocation, second provisioning domain descriptors, each second provisioning domain descriptor comprising a service name or a service set;
    providing, to the application, second provisioning domain descriptors matching the at least one requested service name or service set; and
    selecting second network resources based on a second provisioning domain selected by the application.

2. The method of claim 1, further comprising:
requesting the first provisioning domain descriptors corresponding to the first provisioning domain identifiers.

3. The method of claim 1, wherein the first provisioning domain descriptors and the second provisioning domain descriptors further comprise at least one of an instance identifier and an authentication or authorization token.

4. The method of claim 1, further comprising:
receiving from the application a first request for a first list of provisioning domains and provisioning domain attributes matching at least one service name or a service set in the request;
providing to the application, the first list of provisioning domains and provisioning domain attributes matching at least one service name or a service set in the first request.

5. The method of claim 4, further comprising verifying, by the application, authenticity of at least one received service name or service set and selecting, by the application, at least one provisioning domain with which to communicate based on a verified service name or a service set.

6. The method of claim 5, further comprising:
receiving from the application a notification of the at least one selected provisioning domain.

7. The method of claim 1, further comprising:
connecting to a second network element different from a first network element that provided the first provisioning domain descriptors to the WTRU;
wherein the second provisioning domain descriptors are received after connecting to the second network element.

8. The method of claim 1, further comprising:
connecting, by the application using the first network resources, to a first service instance corresponding to the requested service name or service set; and
connecting, by the application using the second network resources, to a second service instance corresponding to the requested service name or service set.

9. The method of claim 8, wherein the first service instance is the same as the second service instance.

10. The method of claim 8, wherein each of the first provisioning domain descriptors and the second provisioning domain descriptors further comprises an instance identifier, and wherein the method further comprises determining, based on the service name or the service set and the corresponding instance identifier whether to connect, using the second network resources, to a service instance with the first service identifier or to a service instance with a new instance identifier.

11. A wireless transmit/receive unit (WTRU) comprising:
memory storing processor-executable program instructions; and
at least one hardware processor configured to execute the program instructions to:
receive provisioning domain identifiers corresponding to provisioning domains and first provisioning domain descriptors, each first provisioning domain descriptor comprising a service name or a service set;
receive, from an application running on the WTRU, at least one requested service name or service set;
provide to the application provisioning domain identifiers matching the at least one requested service name or service set;
select first network resources based on a first provisioning domain selected by the application;
receive, after WTRU relocation, second provisioning domain descriptors, each second provisioning domain descriptor comprising a service name or a service set;
provide to the application, second provisioning domain descriptors matching the at least one requested service name or service set; and
select second network resources based on a second provisioning domain selected by the application.

12. The WTRU of claim 11, wherein the at least one hardware processor is further configured to execute the program instructions to request the first provisioning domain descriptors corresponding to the first provisioning domain identifiers.

13. The WTRU of claim 11, wherein the first provisioning domain descriptors and the second provisioning domain descriptors further comprise at least one of an instance identifier and an authentication or authorization token.

14. The WTRU of claim 11, wherein the at least one hardware processor is further configured to execute the program instructions to:
receive from the application running on the WTRU, a first request for a first list of provisioning domains and provisioning domain attributes matching at least one service name or a service set in the request; and
provide to the application, the first list of provisioning domains and provisioning domain attributes matching at least one service name or a service set in the first request.

15. The WTRU of claim 14, wherein the at least one hardware processor is further configured to execute the application to verify authenticity of at least one received service name or service set and select at least one verified provisioning domain with which to communicate based on a verified service name or a service set.

16. The wireless transmit/receive unit of claim 11, wherein the at least one hardware processor is further configured to execute the program instructions to connect to a second network element different from a first network element that provided the first provisioning domain descriptors to the WTRU;
wherein the second provisioning domain descriptors are received after connecting to the second network element.

17. The WTRU of claim 11, further comprising:
connecting, by the application using the first network resources, to a first service instance corresponding to the requested service name or service set; and
connecting, by the application using the second network resources, to a second service instance corresponding to the requested service name or service set.

18. The WTRU of claim 17, wherein the first service instance is the same as the second service instance.

19. The WTRU of claim 17, wherein each of the first provisioning domain descriptors and the second provisioning domain descriptors further comprises an instance identifier, and wherein the method further comprises determining, based on the service name or the service set and the corresponding instance identifier whether to connect, using the second network resources, to a service instance with the first service identifier or to a service instance with a new instance identifier.

20. A non-transitory computer-readable storage medium storing instructions that, when executed, cause at least one hardware processor of a wireless transmit/receive unit, WTRU, to:

receive provisioning domain identifiers corresponding to provisioning domains and first provisioning domain descriptors, each first provisioning domain descriptor comprising a service name or a service set;

receive, from an application running on the WTRU, at least one requested service name or service set;

provide to the application provisioning domain identifiers matching the at least one requested service name or service set;

select first network resources based on a first provisioning domain selected by the application;

receive, after WTRU relocation, second provisioning domain descriptors, each second provisioning domain descriptor comprising a service name or a service set;

provide to the application, second provisioning domain descriptors matching the at least one requested service name or service set; and select second network resources based on a second provisioning domain selected by the application.

* * * * *